United States Patent

Jäger et al.

[11] 3,919,183
[45] Nov. 11, 1975

[54] PERFLUOROALKYL GROUPS CONTAINING POLYMERISATION PRODUCTS

[75] Inventors: Horst Jäger, Bettingen; Paul Schäfer, Riehen, both of Switzerland

[73] Assignee: Ciba-Geigy AG, Basel, Switzerland

[22] Filed: Sept. 17, 1973

[21] Appl. No.: 397,522

[30] Foreign Application Priority Data
Sept. 12, 1973  Switzerland............. 13054/73

[52] U.S. Cl............ 260/86.1 R; 117/124; 117/132; 117/138.8; 117/140; 117/142; 117/145; 117/155; 117/161; 260/28.5 D; 260/47 UA; 260/63 UY; 260/78.5 R; 260/78.5 B; 260/83.5; 260/85.5 ES; 260/86.1 N; 260/86.1 E; 260/86.3; 260/86.7; 260/89.3; 260/89.5 H
[51] Int. Cl.²... C08F 3/64; C08F 3/66; C08F 15/16
[58] Field of Search......... 260/89.5 A, 89.3, 86.1 R, 260/86.1 N, 86.1 E, 86.3, 86.7

[56] References Cited
UNITED STATES PATENTS
3,248,260  4/1966  Langerak et al............ 117/161
3,457,247  7/1969  Katsushima et al............ 260/89.5 H Primary Examiner—Harry Wong, Jr.
Attorney, Agent, or Firm—Joseph G. Kolodny; Prabodh I. Almaula; Edward McC. Roberts

[57] ABSTRACT

Polymerisation products of at least one perfluoroalkylalkyl ester of the formula

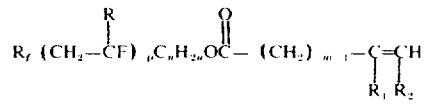

wherein $R_f$ represents an unbranched or branched perfluoroalkyl radical with 3 to 12 carbon atoms, R represents hydrogen or fluorine, and $R_1$ and $R_2$ represent hydrogen or methyl and $m$ is 1 or 2, $n$ is a whole number from 2 to 12, and $p$ is a whole number from 1 to 3, and optionally of other copolymerisable, ethylenically unsaturated monomeric compounds are provided. The polymerisation products can be homopolymers or copolymers.

The polymerisation products are useful for producing oleophobic, hydrophobic or dirt repellent finishes on various substrates.

15 Claims, No Drawings

PERFLUOROALKYL GROUPS CONTAINING POLYMERISATION PRODUCTS

Monomers containing perfluoroalkyl groups, their corresponding polymerisation products and their use as agents for rendering materials oleophobic and hydrophobic are already known. Homopolymers and copolymers that are derived from perfluoroalkylacrylic or methacrylic esters of the formula

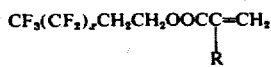

wherein R represents hydrogen or methyl and $x$ is a number from about 3 to 20 are already known from various patents, e.g. U.S. Pat. Nos. 3,248,260 and 3,282,905, British Pat. No. 1,095,900, German Pat. No. 1,469,451, or Swiss Pat. No. 504,577.

From U.S. Pat. No. 3,002,765 there are also known polymers that are obtained by polymerisation of acrylates and methylacrylates of the formula

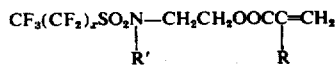

wherein R represents hydrogen or methyl, R' represents lower alkyl and $x$ is a whole number from about 3 to 20.

The known homopolymers and copolymers produce useful oleophobic and hydrophobic effects, but the application amounts of the respective polymers are relatively large. The present invention is based on the observation that it is possible to interrupt the perfluoroalkyl chains in the starting monomers by fluorine-free members, e.g. —CH$_2$— groups, without any impairment of the effect occurring with the application of the corresponding polymers, although the amount of fluorine responsible for the repellent effect is diminished. Further, the new polymerisation products are characterised by a very good repellent property in that they produce very good effects when used in very small amounts (as fluorine deposit on the fibre).

The present invention provides polymerisation products of at least one perfluoroalkylalkyl ester of the formula

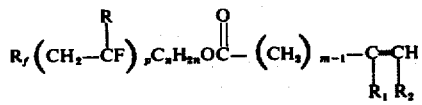

wherein R$_f$ represents an unbranched or branched perfluoroalkyl radical with 3 to 12 carbon atoms, R represents hydrogen or fluorine, and R$_1$ and R$_2$ represent hydrogen or methyl and $m$ is 1 or 2, $n$ is a whole number from 2 to 12, and $p$ is a whole number from 1 to 3, and optionally of other copolymerisable, ethylenically unsaturated monomeric compounds. The polymerisation products can be homopolymers or copolymers.

The perfluoroalkyl radical in formula (1) can be an unbranched or a branched radical with 3 to 12, preferably 4 to 10, carbon atoms, and correspond approximately to the following formulae:

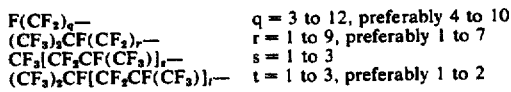

| | |
|---|---|
| F(CF$_2$)$_q$— | $q$ = 3 to 12, preferably 4 to 10 |
| (CF$_3$)$_2$CF(CF$_2$)$_r$— | $r$ = 1 to 9, preferably 1 to 7 |
| CF$_3$[CF$_2$CF(CF$_3$)]$_s$— | $s$ = 1 to 3 |
| (CF$_3$)$_2$CF[CF$_2$CF(CF$_3$)]$_t$— | $t$ = 1 to 3, preferably 1 to 2 |

The straight-chain perfluoroalkyl radicals are preferred, e.g. butyl, hexyl, octyl, and decyl radicals. In the alkylene bridge member —C$_n$H$_{2n}$— in formula (1) $n$ represents a whole number from 2 to 12, but preferably 2.

The homopolymers according to the invention contain the recurring units of the formula (2) 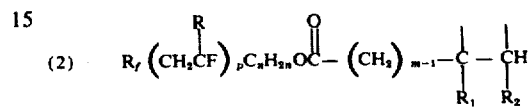

wherein R$_f$, R, R$_1$, R$_2$, $m$, $n$, and $p$ have the indicated meanings.

Particular interest attaches to such homopolymers that contain recurring units of the formulae (3) 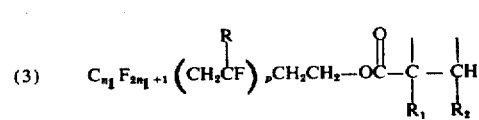

(4) 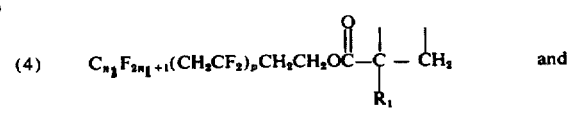 and (5) 

wherein R represents hydrogen or fluorine, and R$_1$ and R$_2$ represents hydrogen or methyl, $n_1$ is a whole number from 4 to 10 and $p$ is a whole number from 1 to 3.

In addition to the cited units for the homopolymers, the copolymers contain recurring units of other ethylenically unsaturated copolymerisable compounds. The number of recurring units can be about 10 to 400. The gram-molecular weight range is accordingly about 5000 to 230,000.

The manufacture of the starting monomers of the formula (1) is carried out by known methods. These compounds are therefore obtained e.g. by reaction of the corresponding perfluoroalkylalkyl iodides with unsaturated monobasic acids or derivatives thereof in the presence of oleum or by reaction of the corresponding perfluoroalkylalkyl nitrates with the unsaturated acids in the presence of sulphuric acid. Suitable acids are e.g. acrylic, methacrylic, crotonic, and vinylacetic acids.

The polymerisation of the monomeric perfluoroalkylalkyl esters can take place in solution or in emulsion and in the presence of catalysts that liberate free radicals with themselves, with another perfluoroalkylalkyl ester or with other compounds that can be polymerised to linear polymers.

Examples of suitable compounds for the copolymerisation with the perfluoroalkylalkyl esters are:

a. vinyl esters of organic carboxylic acids, e.g. vinyl acetate, vinyl formate, vinyl butyrate, vinyl benzoate, b. vinyl alkyl ketones and vinyl alkyl ethers, such as vinyl methyl ketone and vinyl butyl ether, c. vinyl halides, such as vinyl chloride, vinyl fluoride, vinylidene chloride, d. vinylpyrrolidone, e. vinyl aryl compounds, e.g. styrene and substituted styrenes, f. derivatives of the acrylic acid series, e.g. acrylic nitrile or acrylic amide and preferably derivatives substituted at the amide nitrogen, e.g. N-methylolacrylamide, N-methylolacrylic amide alkyl ether, N,N-dihydroxyethylacrylic amide, N-tert.butyl-acrylic amide and hexametholylmelamine triacrylic amide, and the corresponding quaternised compounds, g. esters of the acrylic acid series, e.g. esters of acrylic acid, methacrylic acid, α-chloroacrylic acid, crotonic acid, maleic acid, fumaric acid or itaconic acid, and mono- or dialcohols containing from 1 to 18, preferably 8 to 12 carbon atoms, or phenols, e.g. ethyl acrylate, glycidyl acrylate, butylacrylate, acrylic acid monoglycol ester or dodecylacrylate, or N-dialkylaminoethylmethacrylate and the corresponding quaternised compound, and h. polymerisable olefines, such as isobutylene, butadiene or 2-chlorobutadiene, i. monomers containing perfluoroalkyl groups, such as compounds of the formulae

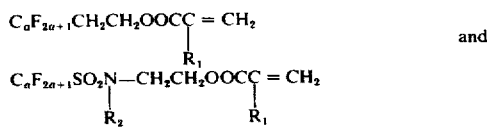

and wherein $a$ is a whole number from 4 to 18, $R_1$ represents hydrogen or methyl, $R_2$ represents hydrogen, methyl, or ethyl.

Preferably there are used esters, amides or methylol amides of acrylic or methacrylic acid, such as ethyl acrylate, hydroxyethyl acrylate and hydroxymethyl acrylate, butyl acrylate, glycidyl acrylate, glycolmonoacrylate, acrylic amide, methacrylate, methacrylic amide, N-methylolacrylic amide, N-methylolacrylic methyl ether, N-tert.butylacrylic amide; vinyl esters of organic carboxylic acids, such as vinyl acetate; styrene, vinyl halides, such as vinyl chloride or vinylidene chloride; or polymerisable olefines, such as isobutylene.

The polymers are composed as a rule of 5 to 100, preferably of 40 to 98, percent by weight of a perfluoroalkylalkyl ester and of 95 to 0, preferably 60 to 2, percent by weight of another compound. Particular industrial importance attaches to those bi-, ter- and quaterpolymers that in addition to 40 to 98 percent by weight of the monomeric carboxylic acid perfluoroalkyl ester, based on the weight of the monomer, contain a reactive monomer, such as N-methylolacrylic amide, an acrylic ester, such as decylacrylate, and optionally a vinyl ester, such as vinyl acetate.

The manufacture of the polymers by homopolymerisation or copolymerisation of perfluoroalkylalkyl esters with one or more other copolymerisable ethylenically unsaturated monomers is carried out by conventional methods, for example by block polymerisation, bead polymerisation, polymerisation in aqueous emulsion or preferably by solvent polymerisation in a solvent suitable for this purpose, e.g. acetone, benzene, sym. dichloroethane, ethyl acetate, or trifluoromethylbenzene.

The polymerisation is effected advantageously with the application of heat, preferably to the boiling temperature of the solvent and accompanied by the addition of catalysts that form peroxidic or other free radicals and are soluble in the reaction medium, e.g. benzoyl peroxide, lauroyl peroxide, α,α'-azobisisobutyronitrile or potassium peroxide disulphate or redox systems, e.g. potassium peroxide disulphate/sodium bisulphite or ferrosulphate.

Depending on the nature of the polymerisation conditions and of the monomeric starting materials used, the polymeric compounds are obtained in the form of emulsions.

It is furthermore also possible to carry out the polymerisation of the monomeric compounds in the presence of substrates. For example, it can be carried out on glass fibre fabrics or textile material. In this case the respective substrate is advantageously impregnated with solutions or emulsions of the monomers and subsequently the polymerisation is effected by addition of a polymerisation catalyst by heating the material.

The preferred polymerisation processes are emulsion polymerisation in an aqueous medium and solvent polymerisation.

The polymerisation is preferably carried out with a reaction time that is so adjusted that a virtually quantitative conversion of the monomer into the polymer is attached. The maximum reaction time depends on the catalyst used and the polymerisation temperature and also on other conditions, but it is generally in the range from 0.5 to 24 hours.

The polymerisation temperature depends in turn on the chosen catalyst. In the case of emulsion polymerisation in aqueous medium it is in general in the range from 20° to 90°C. Whereever possible, the polymerisation is carried out at atmospheric pressure.

In the emulsion polymerisation, the monomer(s) to be polymerised is (are) polymerised jointly in an aqueous solution of an emulsifier under nitrogen to a given monomer concentration of about 5 to about 50%. Normally the temperature is raised to 40° to 70°C in order to effect the polymerisation in the presence of an added catalyst. The concentration of the polymerisation catalyst is generally between 0.1 and 2%, based on the weight of the monomers.

Suitable emulsifiers are cationic, anionic, or non-ionic surfactants. The hydrophobic constituent of the emulsifier can be a hydrocarbon or fluorinated hydrocarbon.

Suitable cationic emulsifiers are for example quaternary ammonium salts, for example quaternary ammonium salts or amine salts that contain at least one long-chain alkyl or fluoroalkyl group, or a benzene or naphthalene group that is highly substituted with alkyl to yield the hydrophobic constituent.

Further suitable emulsifiers are the non-ionic surfactants in which the hydrophilic constituent is a poly(ethoxy) group and the hydrophobic constituent is either a hydrocarbon or a fluorinated hydrocarbon group, e.g. the ethylene oxide condensates of alkylphenols, alkanols, alkylamines, alkylthiols, alkylcarboxylic acids, fluoroalkylcarboxylic acids, fluoroalkylamides and the like. Anionic emulsifiers are for example the sulphuric acid or phosphoric acid esters of the cited ethylene oxide condensates of long-chain alkylphenols, fatty alcohols, and fatty amines.

In the solvent polymerisation, the monomer(s) is (are) dissolved in a suitable solvent, such as fluorinated solvents, for example hexafluoroxylene, benzotrifluoride, or mixtures thereof with acetone and/or ethyl acetate, and polymerised in a reaction vessel accompanied by the use of initiators such as azobisisobutyronitrile or other azo initiators, in concentrations of 0.1 to 2%, at 40° to 100°C under nitrogen.

Preferred solvents are hexafluoroxylene, benztrifluoride, fluorine substituted halogenated hydrocarbons, other fluorinated solvents ans the like.

As stated at the outset, valuable copolymers with other ethylenically unsaturated monomers are obtained in the polymerisation of the new monomers in addition to homopolymers. On completion of the polymerisation, the polymerisation products are obtained in the form of solutions or dispersions that have a solids content of about 10 to 30, preferably 15 to 25, percent by weight. It is advantageous to use these solutions or dispersions direct, optionally in dilute form, for the various applications.

The homopolymers or copolymers according to the invention can be used for treating porous or non-porous substrates, preferably for producing oleophobic, hydrophobic, or dirt repellent finishes thereon. As porous substrates there may be mentioned leather and wood or especially fibre materials, such as textiles and paper. Possible non-porous substrates are chiefly metal, plastic, and glass surfaces.

The compounds according to the invention can also be used for example as additives for oils and lubricants for the prevention of wear and corrosion, or as additives for polishes and waxes.

Examples of textile materials that can be preferably treated with the monomeric or polymeric perfluoro compounds are those from natural or regenerated cellulose, such as cotton, linen, or rayon, staple fibre, or cellulose acetate. Also suitable are textiles made from wool, synthetic polyamides, polyester, or polyacrylonitrile. Blended fabrics or blended knitted fabrics from cotton/polyester fibres can also be finished with advantage. The textiles can be in the form of threads, fibres, flocks, fleeces, but preferably of woven or knitted fabrics, and can be used for example as articles of clothing, upholstery materials, decorating materials, and carpets.

Preparations that contain the polymeric perfluoro compounds can be applied to the substrate in known manner. The substrates can be finished by being treated both with solutions, such as dispersions or emulsions, of the polymeric perfluoro compounds.

Fabrics can be impregnated e.g. by the exhaustion process or on a padder that is coated with the preparation at room temperature. The impregnated material is then dried at 60° to 120°C and subsequently optionally sunjected to a heat treatment at over 100°C, e.g. from 120° to 200°C, advantageously in the presence of known catalysts that donate acid.

Examples of further application methods are spraying, brushing, roll-coating, dusting with subsequent heat fixing or transfer of the polymers from an auxiliary material (paper, foil) accompanied by the application of heat. The compounds according to the invention are applied in amounts of 0.1 to 10, preferably 0.5 to 5, percent by weight based on the substrate.

It is also possible to apply still further agents to the substrates simultaneously with the compounds according to the invention, e.g. wetting agents, soft-handle agents, water repellents, paraffin wax emulsions, resin finishes, or agents that impart crease resistance.

Besides the cited effects that can be attained with the polymers according to the invention it is also possible in particular to achieve soil-release and antisoiling effects on textile fibre substrates. Among the polymerisation products according to the invention the copolymerisation products are particularly suitable for this purpose.

The following Examples describe the invention in more detail but are in no way limitative thereof. The parts and percentages are by weight unless otherwise stated.

EXAMPLE 1 a. A mixture of 30 parts of water, 0.6 part of dodecyltrimethylammonium chloride, 0.6 part of octadecyltrimethylammonium chloride, 0.4 part of vinyl acetate, 0.4 part of N-methylolacrylic amide, 5 parts of acetone and 9.2 parts of the compound of the formula $CF_3(CF_2)_m(CH_2CF_2)_n$ $CH_2CH_2OOCCH=CH_2$ *) is heated with stirring in a nitrogen atmosphere to 70°C. A solution of 0.025 part of potassium peroxide disulphate in 2.5 parts of water is added whereupon polymerisation occurs. Twenty minutes later a solution of 0.025 part of potassium peroxide disulphate in 2.5 parts of water is again added. The resulting emulsion is kept for 3 hours at 70°C to bring the polymerisation to completion. About 51 parts of a finely dispersed emulsion with a resin content of 20.3% (corresponding to a yield of 98%) is obtained.

The copolymers of the following fluorinated monomer compounds are manufactured according to procedure (a):

b. $C_4F_9CH_2CF_2CH_2CH_2OOCCH=CH_2$ **)
c. $C_nF_{2n+1}(CH_2CF_2)_nCH_2CH_2OOCCH=CH_2$ ***)
d. $C_nF_{2n+1}CH_2CHFCH_2CH_2OOCCH=CH_2$ ****)
e. 10.8 % $C_6F_{13}CH_2CH_2OOCC(CH_3)=CH_2$
   45.6 % $C_8F_{17}CH_2CH_2OOCC(CH_3)=CH_2$
   31.4 % $C_{10}F_{21}CH_2CH_2OOCC(CH_3)=CH_2$
   7.2 % $C_{12}F_{25}CH_2CH_2OOCC(CH_3)=CH_2$

Remainder on 100% impurities.

Example 1(e) is a comparison example.

EXAMPLE 2 a. A mixture of 25 parts of water, 0.6 part of dodecyltrimethylammonium chloride, 0.6 part of octadecyltrimethylammonium chloride, 4.6 parts of hexylmethacrylate, 0.4 part of N-methylolacrylic amide, 5 parts of acetone, and 5 parts of the compound of the formula $C_nF_{2n+1}(CH_2CF_2)_n$ $CH_2CH_2OOCCH=CH_2$ *) is heated with stirring in a nitrogen atmosphere to 60°C. A solution of 0.025 part of potassium peroxide disulphate in 2.5 parts of water and a solution of 0.007 part of sodium metabisulphite in 2.5 parts of water are added whereupon polymerisation occurs. Twenty minutes later a solution of 0.025 part of potassium peroxide disulphate in 2.5 parts of water and a solution of 0.007 part of sodium metabisulphite in 2.5 parts of water are added once more. The resulting emulsion is kept for 3 hours at 60°C to bring the polymerisation to completion. About 51 parts of a finely disperse emulsion with a resin content of 20.3% (corresponding to a yield of 98%) is obtained.

The copolymers of the following fluorinated monomer compounds are manufactured according to the procedure 2(a):

b) $C_nF_{2n+1}(CH_2CF_2)_pCH_2CH_2OOCCH=CH_2$ *****)
$C_nF_{2n+1}CH_2CH_2OOCCH=CH_2$ c) $C_nF_{2n+1}(CH_2CF_2)_pCH_2CH_2OOCCH=CH_2$ ******)

d) Composition of the fluorinated monomer as 1 e) (comparison example).

e) Composition of the fluorinated monomer
$C_aF_{2a+1}CH_2CH_2OOCC(CH_3)=CH_2$ ******)
$a = 6 - 12$
(comparison example).

f) Composition of the fluorinated monomer
$C_8F_{17}SO_2N(R')CH_2CH_2OOCC(CH_3)=CH_2$
$R' = $ lower alkyl
(comparison example)

The polymers from (e) and (f) are commercial products.

The monomer mixture contains (analysis by gas chromatography):

*) 14.14 % $C_6F_{13}CH_2CF_2CH_2CH_2OOCCH=CH_2$
45.94 % $C_8F_{17}CH_2CF_2CH_2CH_2OOCCH=CH_2$
8.43 % $C_{10}F_{21}CH_2CF_2CH_2CH_2OOCCH=CH_2$
15.53 % $C_6F_{13}(CH_2CF_2)_2CH_2CH_2OOCCH=CH_2$
8.7 % $C_8F_{17}(CH_2CF_2)_2CH_2CH_2OOCCH=CH_2$
2.9 % $C_{10}F_{21}(CH_2CF_2)_2CH_2CH_2OOCCH=CH_2$
1.43 % $C_6F_{13}(CH_2CF_2)_3CH_2CH_2OOCCH=CH_2$
Remainder on 100% impurities.

**) 94.8 % $C_4F_9CH_2CF_2CH_2CH_2OOCCH=CH_2$
3.62 % $C_4F_9CH_2CF_2CH_2CH_2OH$
Remainder on 100% impurities.

***) 26.26 % $C_6F_{13}CH_2CF_2CH_2CH_2OOCCH=CH_2$
24.12 % $C_8F_{17}CH_2CF_2CH_2CH_2OOCCH=CH_2$
15.30 % $C_{10}F_{21}CH_2CF_2CH_2CH_2OOCCH=CH_2$
30.00 % $C_{6-10}F_{13-21}(CH_2CF_2)_2CH_2CH_2OOCCH=CH_2$
Remainder on 100% impurities.

****) 40.80 % $C_6F_{13}CH_2CHFCH_2CH_2OOCCH=CH_2$
38.19 % $C_8F_{17}CH_2CHFCH_2CH_2OOCCH=CH_2$
16.27 % $C_{10}F_{21}CH_2CHFCH_2CH_2OOCCH=CH_2$
Remainder on 100% impurities.

*****) 2.85 % $C_6F_{13}CH_2CH_2OOCCH=CH_2$
8.60 % $C_8F_{17}CH_2CH_2OOCCH=CH_2$
9.94 % $C_{10}F_{21}CH_2CH_2OOCCH=CH_2$ 14.63 % $C_6F_{13}CH_2CF_2CH_2CH_2OOCCH=CH_2$
26.00 % $C_8F_{17}CH_2CF_2CH_2CH_2OOCCH=CH_2$
23.73 % $C_{10}F_{21}CH_2CF_2CH_2CH_2OOCCH=CH_2$
5.90 % $C_6F_{13}(CH_2CF_2)_2CH_2CH_2OOCCH=CH_2$
4.50 % $C_8F_{17}(CH_2CF_2)_2CH_2CH_2OOCCH=CH_2$
1.90 % $C_{10}F_{21}(CH_2CF_2)_2CH_2CH_2OOCCH=CH_2$

******) 43.90 % $C_6F_{13}CH_2CF_2CH_2CH_2OOCCH=CH_2$
26.00 % $C_8F_{17}CH_2CF_2CH_2CH_2OOCCH=CH_2$
3.00 % $C_{10}F_{21}CH_2CF_2CH_2CH_2OOCCH=CH_2$
10.10 % $C_6F_{13}(CH_2CF_2)_2CH_2CH_2OOCCH=CH_2$
5.70 % $C_8F_{17}(CH_2CF_2)_2CH_2CH_2OOCCH=CH_2$
1.30 % $C_{10}F_{21}(CH_2CF_2)_2CH_2CH_2OOCCH=CH_2$
5.50 % $C_6F_{13}(CH_2CF_2)_3CH_2CH_2OOCCH=CH_2$
Remainder on 100% impurities.

Application of the Polymers

1. Cotton fabric, polyester/cotton fabric (65/35), and various synthetic fabrics are impregnated with the following liquors.

The amount of fluorine applied is between 0.075 and 0.2 percent by weight based on the weight of the substrate. The fabric is impregnated on a padder, dried at 90°C and heat fixed for 30 seconds at 150°C.

The finished fabrics are tested for their oil repellency by the AATCC Test Procedure 118-1966 of the American Association of Textile Chemists and Colorists (AATCC). The repellencies are between 0 and 8,8 being the best repellency value.

The water repellent properties are determined quaternatively on the basis of the water absorption after the fabrics have been briefly sprinkled. The moisture absorption in percent by weight, based on the solids content of the samples, is determined. The smaller the percentages the better the water repellent properties.

The liquor compositions and the repellency values obtained are listed in the following table.

Table 1

| Polymer according to procedure | 1a | | | 1b | | | 1c | | | 1d | | | 1e | |
|---|---|---|---|---|---|---|---|---|---|---|---|---|---|---|
| Polymer in g/l | 14 | 28 | 28 | 32 | 16 | 32 | 32 | 32 | 32 | 32 | 32 | 32 | 17.5 | 35 |
| Aminoplast precondensate in g/l 1) | — | 50 | 50 | — | 50 | 50 | — | 50 | 50 | — | 50 | 50 | 50 | 50 |
| MgCl$_2$.6H$_2$O g/l | — | 8 | 8 | — | 8 | 8 | — | 8 | 8 | — | 8 | 8 | 8 | 8 |
| Extender g/l 2) | — | — | 30 | — | — | — | — | — | 30 | — | — | 30 | — | — |
| Amount of flurone in percent by weight (on the fibre material) | 0.1 | 0.2 | 0.2 | 0.2 | 0.1 | 0.2 | 0.2 | 0.2 | 0.2 | 0.2 | 0.2 | 0.2 | 0.1 | 0.2 |
| Cotton | | | | | | | | | | | | | | |
| oil repellency | 6 | 6 | 5 | 5 | 4 | 5 | 6 | 6 | 5 | 6 | 2 | 5 | 3 | 5 |
| water repellency | 47 | 47 | 6 | — | — | — | — | 44 | 3 | 50 | 107 | 16 | — | — |
| Amount of fluorine in percent by weight (on the fibre material) | 0.075 | 0.15 | 0.15 | 0.15 | 00.75 | 0.15 | 0.15 | 0.15 | 0.15 | 0.15 | 0.15 | 0.15 | 0.075 | 0.15 |
| Cotton/polyester | | | | | | | | | | | | | | |
| oil repellency | 5 | 5 | 5 | 2 | 2 | 3 | 5 | 6 | 5 | 5 | 5 | 5 | 1 | 4 |
| water repellency | 3 | 6 | 2 | — | — | — | — | 1 | 1 | 22 | 21 | 1 | — | — |

1) 50 aqueous preparation of 1 mole of hexamethylolmelamine-hexamethyl ether and 1 mole of dimethylolethyl urea.
2) Paraffin wax emulsion Table 2

| Polymer according to procedure | 2a | | 2b | | | 2c | | | 2d | | 2e | | 2f | |
|---|---|---|---|---|---|---|---|---|---|---|---|---|---|---|
| Polymer in g/l | 32 | 16 | 32 | 62 | 31 | 62 | 62 | 31 | 50 | 64 | 32 | 64 | 32 | 64 | 32 | 64 |
| Aminoplast precondensate in g/l 1) | — | 50 | 50 | — | 50 | 50 | — | 50 | 50 | — | 50 | 50 | 50 | 50 | 50 | 50 |
| MgCl$_2$.6H$_2$O g/l | — | 8 | 8 | — | 8 | 8 | — | 8 | 8 | — | 8 | 8 | 8 | 8 | 8 | 8 |
| Extender g/l 2) | — | — | 30 | — | 30 | 30 | — | 30 | 30 | — | — | — | — | — | — | — |
| Amount of fluorine in percent by weight (on the fibre material) | 0.2 | 0.1 | 0.2 | 0.2 | 0.1 | 0.2 | 0.2 | 0.1 | 0.2 | 0.2 | 0.1 | 0.2 | 0.1 | 0.2 | 0.1 | 0.2 |
| Cotton repellency | 6 | 5 | 6 | 6 | 5 | 6 | 6 | 5 | 6 | 5 | 4 | 6 | 0 | 2 | 1 | 2 |
| water repellency | 14 | 23 | 1 | 39 | 29 | 24 | 41 | 32 | 36 | — | — | 33 | 16 | 98 | 85 |
| Amount of fluorine | 0.15 | 0.075 | 0.15 | 0.15 | 0.075 | 0.15 | 0.15 | 0.075 | 0.15 | 0.15 | 0.075 | 0.15 | 0.075 | 0.15 | 0.075 | 0.15 |

Table 2-continued

| Polymer according to procedure | 2a | | 2b | | | 2c | | 2d | | | 2e | | 2f | |
|---|---|---|---|---|---|---|---|---|---|---|---|---|---|---|
| in percent by weight (on the fibre material) Cotton/polyester | | | | | | | | | | | | | | |
| oil repellency | 5 | 4 | 5 | 4 | 4 | 5 | 2 | 3 | 6 | 2 | 2 | 5 | 2 | 3 | 2 | 2 |
| water repellency | 3 | 2 | 1 | 8 | 26 | 19 | 16 | 26 | 5 | — | — | — | 1 | 1 | 18 | 13 |

Table 3

| Polymer according to procedure | 2 a | | 2 e | | 2 f | |
|---|---|---|---|---|---|---|
| Polymer in g/l | 16 | 32 | 32 | 64 | 32 | 64 |
| Aminoplast precondensate in g/l 1) | 50 | 50 | 50 | 50 | 50 | 50 |
| $MgCl_2 \cdot 6H_2O$ g/l | 8 | 8 | 8 | 8 | 8 | 8 |
| Amount of fluorine in percent by weight (on the fibre material) | 0.075 | 0.15 | 0.075 | 0.15 | 0.075 | 0.15 |
| Oil repellency: | | | | | | |
| polyester | 5 | 7 | 2 | 5 | 2 | 5 |
| polyamide | 5 | 7 | 2 | 5 | 2 | 5 |
| polyacrylonitrile | 5 | 7 | 2 | 6 | 2 | 4 |

We claim:

1. Homopolymers which contain about 10 to 400 recurring units of the formula $$R_f\left(CH_2-CF\overset{R}{|}\right)_p C_nH_{2n}O\overset{O}{\overset{\|}{C}}-(CH_2)_{m-1}-\overset{|}{\underset{R_1}{C}}-\overset{|}{\underset{R_2}{C}}H$$

wherein $R_f$ represents an unbranched or branched perfluoroalkyl radical with 3 to 12 carbon atoms,
R represents hydrogen or fluorine,
$R_1$ and $R_2$ represents hydrogen or methyl and
m is 1 or 2,
n is a whole number from 2 to 12, and
p is a whole number from 1 to 3.

2. Homopolymers according to claim 1, which contain about 10 to 400 recurring units of the formula $$C_{n_1}F_{2n_1+1}\left(CH_2\overset{R}{\underset{|}{C}}F\right)_p CH_2CH_2-O\overset{O}{\overset{\|}{C}}-\overset{|}{\underset{R_1}{C}}-\overset{|}{\underset{R_2}{C}}H$$

wherein R represents hydrogen or fluorine and $R_1$ and $R_2$ represent hydrogen or methyl, $n_1$ is a whole number from 4 to 10, and p is a whole number from 1 to 3.

3. Homopolymers according to claim 2, which contain about 10 to 400 recurring units of the formula $$C_{n_1}F_{2n_1+1}(CH_2CF_2)_p\,CH_2CH_2-O\overset{O}{\overset{\|}{C}}-\overset{|}{\underset{R_1}{C}}-CH_2$$

wherein $R_1$, $n_1$ and p have the meanings given in claim 3.

4. Homopolymers according to claim 2, which contain about 10 to 400 recurring units of the formula $$C_{n_1}F_{2n_1+1}\,CH_2CHF\,CH_2CH_2O\overset{O}{\overset{\|}{C}}-\overset{|}{\underset{R_1}{C}}-CH_2$$

wherein $R_1$ has the meaning given in claim 2.

5. Copolymers which contain about 10 to 400 recurring units of the formula $$R_f\left(CH_2\overset{R}{\underset{|}{C}}F\right)_p C_nH_{2n}O\overset{O}{\overset{\|}{C}}-(CH_2)_{m-1}-\overset{|}{\underset{R_1}{C}}-\overset{|}{\underset{R_2}{C}}H$$

wherein $R_f$ represents an unbranched or branched perfluoroalkyl radical with 3 to 12 carbon atoms,
R represents hydrogen or fluorine,
$R_1$ and $R_2$ represents hydrogen or methyl and
m is 1 or 2,
n is a whole number from 2 to 12 and
p is a whole number from 1 to 3, and up to 95% by weight of recurring units of at least one other ethylenically unsaturated monomer compound.

6. Copolymers according to claim 5, which contain about 10 to 400 recurring units of the formula $$C_{n_1}F_{2n_1+1}\left(CH_2\overset{R}{\underset{|}{C}}F\right)_p CH_2CH_2-O\overset{O}{\overset{\|}{C}}-\overset{|}{\underset{R_1}{C}}-\overset{|}{\underset{R_2}{C}}H$$

wherein R represents hydrogen or fluorine and $R_1$ and $R_2$ represent hydrogen or methyl, $n_1$ is a whole number from 4 to 10, and p is a whole number from 1 to 3.

7. Copolymers according to claim 6, which contain about 10 to 400 recurring units of the formula $$C_{n_1}F_{2n_1+1}(CH_2CF_2)_p\,CH_2CH_2-O\overset{O}{\overset{\|}{C}}-\overset{|}{\underset{R_1}{C}}-CH_2$$

wherein $R_1$, $n_1$ and $p$ have the meanings given in claim 6.

8. Copolymers according to claim 6, which contain about 10 to 400 recurring units of the formula

wherein $R_1$ has the meaning given in claim 6.

9. Copolymers according to claim 5, wherein as comonomers there are used members selected from the group consisting of esters, amides, methylol amides of acrylic or methacrylic acid, which optionally contain perfluoroalkyl groups, styrene, vinyl halides, vinylidene halides, vinyl esters of organic acids, and polymerisable olefines.

10. A process for the manufacture of polymerisation products according to claim 5, wherein perfluoroalkyl esters of the formula 8n

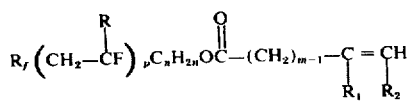

wherein $R_f$ represents an unbranched or branched perfluoroalkyl radical with 3 to 12 carbon atoms,
R represents hydrogen or fluorine, and
$R_1$ and $R_2$ represent hydrogen or methyl and
$m$ is 1 or 2,
$n$ is a whole number from 2 to 12, and
$p$ is a whole number from 1 to 3, are polymerised with up to 95% by weight of at least one other copolymerisable ethylenically unsaturated monomer compound.

11. A process according to claim 10, wherein perfluoroalkylalkyl esters of the formula

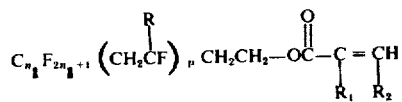

wherein R represents hydrogen or fluorine and $R_1$ and $R_2$ represent hydrogen or methyl, $n_1$ is a whole number from 4 to 10 and $p$ is a whole number from 1 to 3, are polymerised.

12. A process according to claim 10, wherein perfluoroalkylalkyl esters of the formula

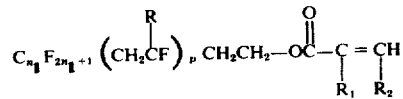

wherein R represents hydrogen or fluorine and $R_1$ and $R_2$ represent hydrogen or methyl, $n_1$ is a whole number from 4 to 10, and $p$ is a whole number from 1 to 3, are polymerised together with members selected from the group consisting of esters, amides, methylol amides of acrylic or methacrylic acid, which optionally contain perfluoroalkyl groups, styrene, vinyl halides and vinylidene halides, vinyl esters of organic acids, and polymerisable olefines.

13. A process according to claim 10, wherein the polymerisation is carried out in an organic or in an aqueous emulsion.

14. A process according to claim 10, wherein the polymerisation is carried out in the presence of a catalyst that forms radicals.

15. Polymerization products according to claim 5 wherein the product contained 40 to 98% perfluoroalkylalkyl ester and 60 to 2% of the other copolymerizable ethylenically unsaturated monomeric compound.

* * * * *

UNITED STATES PATENT AND TRADEMARK OFFICE
CERTIFICATE OF CORRECTION

PATENT NO. : 3,919,183
DATED : November 11, 1975
INVENTOR(S) : HORST JÄGER ET AL It is certified that error appears in the above—identified patent and that said Letters Patent are hereby corrected as shown below:

Column 9, claim 3, line 64, delete "3" and substitute --- 2 ---.

Column 11, claim 10, line 22, delete "8n".

Signed and Sealed this fifteenth Day of June 1976

[SEAL]

Attest:

RUTH C. MASON
*Attesting Officer*

C. MARSHALL DANN
*Commissioner of Patents and Trademarks*